INVENTORS.
HARALD A. ENGE
DONALD L. SMITH
BY

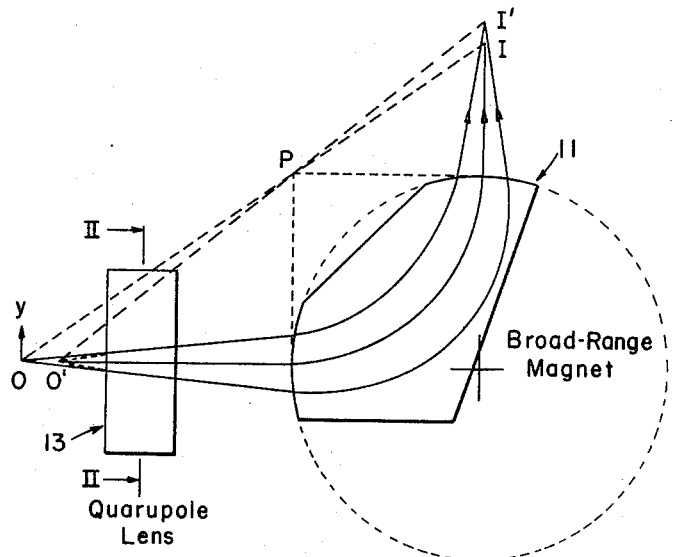
Fig. 1
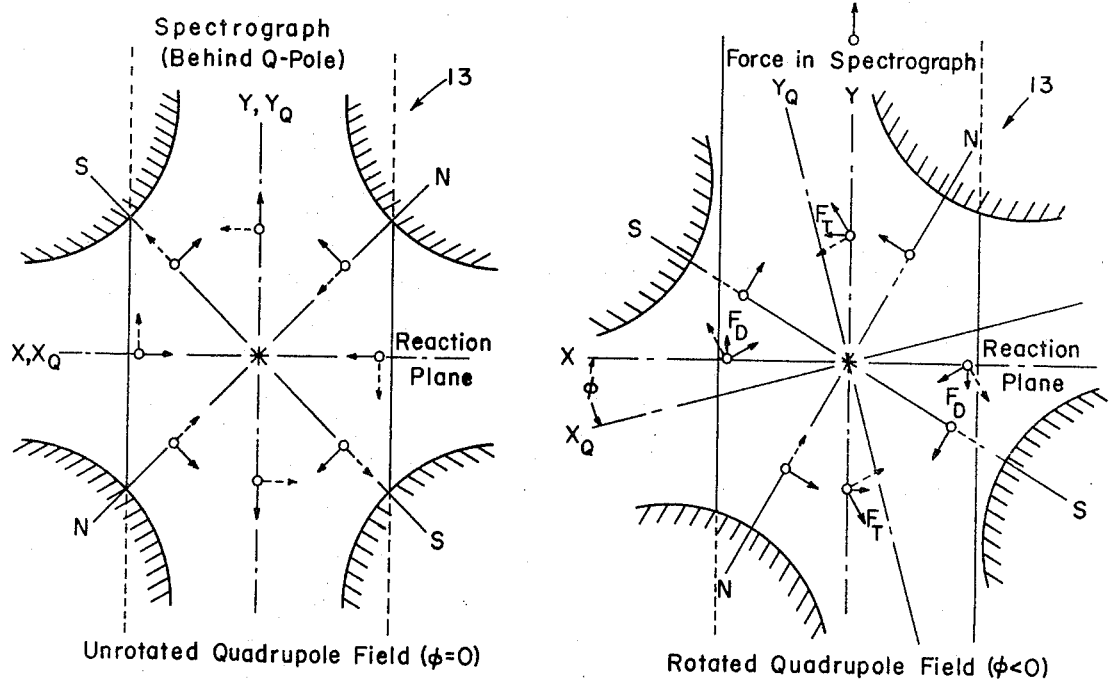
- → Force Field (Positive Charges)
- --→ Magnetic Field
- ○ Particle Velocity (Into Paper)
- $F_D$ Doppler Corrective Force Component
- $F_T$ Defocusing Force Component
Fig. 2
Fig. 3
INVENTORS.
HARALD A. ENGE
BY DONALD L. SMITH

United States Patent Office 3,524,056
Patented Aug. 11, 1970

3,524,056
DOUBLE FOCUSING SPECTROGRAPH EMPLOYING A ROTATABLE QUADRUPOLE LENS TO MINIMIZE DOPPLER BROADENING
Harald A. Enge, Winchester, Mass., and Donald L. Smith, Vero Beach, Fla., assignors to the United States of America as represented by the United States Atomic Energy Commission
Filed Jan. 5, 1968, Ser. No. 695,977
Int. Cl. H01j 39/34
U.S. Cl. 250—41.9
4 Claims

ABSTRACT OF THE DISCLOSURE

Large-transmission charged-particle spectrographic system having a quadrupole lens rotatable about an axis between a target and a dispersing magnet producing double-focused images corrected for Doppler broadening by selection of the proper angular position of the quadrupole about the axis.

BACKGROUND OF THE INVENTION

This invention was made in the course of, or under a contract with the United States Atomic Energy Commission.

A magnetic spectrograph for precision nuclear reaction work needs a large solid angle and high resolving power but these requirements can be fulfilled simultaneously only when it is possible to correct for Doppler broadening (kinematic broadening) of the image lines produced in the spectrograph detector since the energy of the emitted particle in the nuclear reaction depends upon the reaction angle. Various proposals have been made and used to accomplish such correction for Doppler broadening comprising the system described by the co-inventor of this application in Rev. Sci. Instr. 29, 885 (1958), wherein a quadrupole magnetic lens, which has been placed between the target and the deflecting magnet to enhance the solid angle gain, has permitted the movement of the detector closer to the deflecting magnet to provide Doppler broadening correction. While this system has been effective and successful, it has involved complicated and expensive transposition means for biasing the detector. Also, the defocusing plane of the quadrupole and the median plane of the deflecting magnet have been in the reaction plane of the target whereby it has not been possible to move the detector in accordance with this system for Doppler broadening correction in multiple-gap spectrometers where the latter have had perpendicular reaction and median gap deflecting planes for multiple angle spectrometry, such as described in Rev. Sci. Instr. 34, 155 (1962). As is understood in the art from the above-mentioned publications, and the hereinafter referred to U.S. Pat. 3,084,249 and Report MIT 2098-276 by the inventor of this application, the above-mentioned "reaction plane," to which further reference is also made, hereinafter, is the plane defined by two intersecting straight lines that are (a) the beam center line, and (b) the center line of the bundle of trajectories of particles admitted to the spectrograph. Moreover, it has been advantageous to provide practical and efficient means for rapidly directly indicating the Doppler broadening correction.

It is an object of this invention, therefore, to provide an improved large solid angle spectrometer system having perpendicular median gap deflecting and reaction planes by providing practical and efficient means for Doppler broadening correction therein;

It is another object to provide a practical and efficient means for rapidly, directly indicating Doppler broadening correction in a spectrometer system having a deflecting magnet and a quadrupole focusing lens between the target and the deflecting magnet;

It is a further object to provide a spectrometer system having a rotatable quadrupole lens.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

SUMMARY OF THE INVENTION

In accordance with this invention Doppler broadening correction is achieved by rotating a quadrupole lens around an axis along the path of the reaction particles from a target in a reaction plane and through a deflecting magnet to a detector in a plane at right angles to the reaction plane. The method and construction involved in this invention utilize standard and well known techniques and apparatus and are highly flexible for a wide range of particles, targets, spectrographs and solid-angles. More particularly, this invention involves a rotatable quadrupole lens, means for accurately rotating the lens, and means for accurately determining the angular position of the lens for accurately, rapidly and efficiently determining the Doppler broadening correction. With the proper selection of elements, as described in more detail hereinafter, the desired correction and indication are obtained.

BRIEF DESCRIPTION OF THE DRAWINGS

In the drawings where like elements are referenced alike:

FIG. 1 is a partial schematic side view of a quadrupole lens and a dipole deflecting magnet for broad range spectrography;

FIG. 2 is a partial cross-section of the quadrupole lens of FIG. 1 through II—II;

FIG. 3 shows the quadrupole lens of FIG. 2 rotated about the axis thereof;

DESCRIPTION OF THE PREFERRED EMBODIMENT

Figure 4:
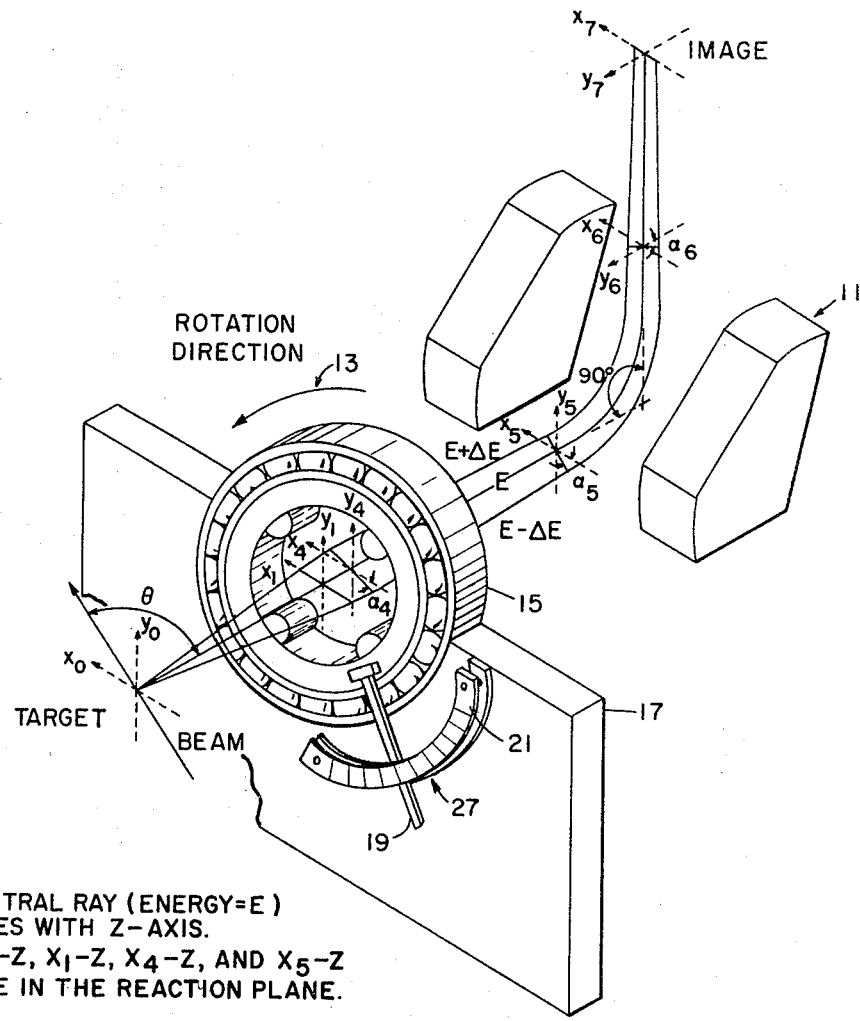
FIG. 4 is a partial three-dimensional view of the quadrupole lens and dipole deflecting magnet of FIG. 1 illustrating a rotatable quadrupole lens in accordance with this invention.

It is known that nuclear reaction products collected over a finite solid angle may be energy separated in a spectrograph by deflection in a path from a target to a detector by a dipole deflecting magnet with provision for focusing by a quadrupole lens preceding the deflecting magnet. A spectrograph employing an energy-separating dipole deflecting magnet having opposite north and south poles and a quadrupole focusing lens having two alternate north and south poles is shown in FIG. 1 of U.S. Pat. 3,084,249 by the co-inventor of this application. A detailed cross-section view of the construction of the energy separating dipole deflecting magnet is shown in FIG. 1a thereof and a right angle dipole deflecting system is illustrated in FIG. 2 thereof. A detailed view of the quadrupole focusing lens is shown in FIG. 1b thereof. In the system described in this patent, a target comprising a thin film of known composition is mounted in a plane in a target chamber and bombarded by a beam of charged particles. For example, the target may comprise $Al^{27}$ and the beam of charged particles may be a beam of 6-mev. deuterons. Bombardment of the target results in nuclear reaction products which are focused and deflected by the quadrupole magnetic lens in conjunction with the dipole magnet to produce characteristic spectrometer lines in the detector. The invention hereinafter described utilizes a spectrograph having a deflecting magnet and a quadrupole magnetic focusing lens of the types described and shown in this above-referenced patent in which the quadrupole lens is rotated to correct for Doppler broadening of the spectrometer lines produced in the detector. A mathematical treatment and a review of the principles involved in this invention are given in Report MIT 2098–276 entitled, "A Large Transmission Magnetic Heavy-Particle Spectrometer With Good Resolving Power" and Report MIT 2098–294 entitled, "A High Resolution Charged-Particle Spectrometer With Doppler Correction," by the co-inventors of this application.

In order to explain how the method and apparatus of this invention accomplish the function of correcting for Doppler broadening of the characteristic spectrograph lines in the detector, reference is made to FIG. 1, which indicates how first-order stigmatic focusing is obtained with a dipole deflecting magnet 11 and a preceding quadrupole focusing lens 13. A 90 degree deflection in the magnet 11 is indicated; however, stigmatic focusing can be obtained for other angles of deflection. The solid angle is enhanced because many particles that would otherwise strike the deflecting magnet walls are focused into the gap thereof by the quadrupole 13. The image point I′ obtained when a quadrupole 13 is used lies further from the deflecting magnet boundary than the image point I obtained without a lens 13. When the quadrupole is enegized to produce a uniform gradient magnetic field therein, as is well known for example from the above cited references and Rev. Sci. Instr. 31, 193–196 (1960), the effective object point for the dipole deflecting magnet is not the source point O but the virtual point O′, which lies closer to the magnet 11. A simple geometrical construction, known as Barber's rule (Rev. Sci. Instr. 27, 899 (1956)), yields the image point I. The stigmatic focusing illustrated in FIG. 1 is obtained for monoenergetic particles only when the quadrupole lens 13 is not rotated.

FIGS. 2 and 3 illustrate these and further focusing properties of a magnetic quadrupole lens 13. In FIG. 2, the focusing plane of the lens 13 coincides with the reaction plane. Particles moving in this plane experience no forces tending to deflect them from the plane, although they are focused toward the axis of the lens 13. Particles moving in a plane normal to the reaction plane are defocused but experience no forces tending to deflect them away from the original plane. Stated another way, the force vectors are converging in the reaction plane and diverging in the median plane. Thus particles moving to the left of the Y axis have higher energy and the particles moving to the right of the Y axis have lower energy than the median ray because of the Doppler effect (nuclear recoil).

When the quadrupole lens 13 is rotated for Doppler correction as shown in FIG. 3, the focusing is no longer stigmatic in the sense that first-order cross terms in the initial ray conditions will contribute to the image. Thus, as shown in FIG. 3, particles moving initially in the reaction plane experience a force $F_D$ tending to deflect them from the reaction plane when they traverse the quadrupole lens 13 of FIG. 3. This deflection is antisymmetrical with respect to the axis of this lens 13 with zero deflection along its axis. Since, as mentioned above, the field strength in a quadrupole lens 13 has a uniform field gradient, that is the field therein increases linearly with distance from the axis thereof and on the axis, it vanishes, the force components $F_D$ and $F_T$ depend linearly on the distance from the axis. Thus the rotation of the quadrupole lens 13 as shown in FIG. 3, produces vertical force components $F_D$, which aid the deflecting force in the deflecting magnet 11 for higher energy particles and oppose the force in the deflecting magnet 11 for the lower energy particles thereby to affect cancellation of the Doppler broadening at the appropriate angle of rotation.

In a practical embodiment of this invention illustrated in FIG. 4, the dipole magnet 11 and quadrupole 13 are incorporated in the MIT multiple-gap spectrograph. As described in Rev. Sci. Instr. 34, 155 (1962), this spectrograph has deflecting magnets like the magnet 11 shown in FIG. 1. In accordance with this invention a rotatable quadrupole lens 13, such as shown in FIG. 3, is added to cancel Doppler broadening. The gap of the deflecting magnet 11 is 1.5 in. wide and the radius of the virtual (effective) field boundary is approximately 51.3 cm. The distance from the target position to the virtual-field boundary is also 51.3 cm. The detector is a 3 in. diameter by 5 mm. thick plastic wafer scintillator mounted on a conventional photomultiplier tube.

Advantageously, the quadrupole lens 13 has a half aperture of 2.7 cm., an effective length of about 15.3 cm., and its entrance boundary is located about 7.6 cm. from the target (not shown for ease of explanation). Also, the magnetic quadrupole lens 13 has a circular outside diameter mounted in a roller bearing 15 that is held by a support 17 built to maintain the outer race of bearing 15 stationary. A rotator means 19, such as a handle attached to lens 13, having means 21 forming indicia calibrated in degrees on support 17, directly shows the angular position of the quadrupole 13 about its axis. Also, the handle 19 is movably compressed in a tight fitting guide 27 to hold the exact position selectively provided by moving the lens 13 with the handle 19, and indicia 21 cooperate with the movement of handle 19 to indicate the angular rotation of the lens 13 around its axis.

In this example, the lens-to-magnet field ratio $B_1/B_0$ is set so that a first-order focus of lens 13 is obtained in both the median plane and the transverse direction, at the same distance from the magnet 11 ($B_1$ is the magnetic induction at the pole tips of the lens). The detector slit is then suitably positioned.

The position for a first-order focus was found experimentally by detecting 5.5 mev. protons elastically scattered from a thin gold target. Gold was used because the Doppler broadening is small for (p,p) scattering on a heavy nucleus. The search for the focal condition was made with the scintillation detector, and then the focused image was recorded on a piece of nuclear track plate that was taped in front of the detector slits. The lens-to-magnet field ratio for the best focus was found to be $B_1/B_0=0.728$, and the distance from the virtual field boundary to the image was approximately 49.3 cm. The measured resolution was about 6-Kev. FWHM, corresponding to a resolving power of $E/\Delta E=920$. The focused image was about 1.5 to 2 cm. long because the beam spot on the target was about 1 to 2 mm. wide and the magnification was about 10 in the transverse direction. The central image shift, if any with respect to the fiducial marks on photographs taken at the detector, indicates the relation of the beam spot to the median plane of the spectrometer.

The solid angle of the combination was measured by opening up the detector slits and recording elastically scattered protons from the gold target. By assuming that the Rutherford cross section formula is correct at 5.5 mev. and 45 degrees, we obtained a solid angle $\Omega=32$ millisteradians.

In order to study the Doppler broadening and its correction with the apparatus of FIG. 4, a thin $Cu^{63}$ target was bombarded with 5.5 mev. protons, and the elastically scattered particles were detected on nuclear-track plate. Two exposures were made, one with the quadrupole lens 13 unrotated (the position thereof being as shown in FIG. 2 wherein a line through the north poles and a line through the south poles are at 45° to the y axis and also the x axis which is in the reaction plane) and one with the quadrupole lens 13 rotated by 3.7 degrees around its axis from that position (that position being as shown in FIG. 3). The latter position produced much narrower image lines on the detector in the direction of the dispersion (vertical), resulting in greatly improved resolving power compared to the former unrotated position. The slight line curvature that occurred, probably resulted from second-order aberrations.

In the operation of the embodiment of this invention illustrated in FIG. 4, the paths taken by particles emitted in the reaction plane from a point source are shown. It is indicated therein how an unrotated line image is formed even in the presence of Doppler broadening. The transverse dimensions of the image are somewhat exaggerated in the figure, when small rotation angles are considered. It will be seen that the departure from stigmatic focusing for the rays shown in FIG. 4 occurs because of the presence of a term that varies as $\phi^2$ for small $\phi$, where $\phi$ is the sense of rotation. However, when $\phi$ corresponds to 3.7 degrees, as described above, this term spreads the image in the x direction by several millimeters.

The variation in energy of particles is linear in the deviation from a median reaction plane angle for small values of angular deviation, and the linear variation of the force component $F_D$ in the quadrupole lens 13 matches the variation in energy of the particles traversing it in such a way that the effect of Doppler broadening of the image may be eliminated to first order if the magnitude and sense of rotation $\phi$ are properly chosen as described above. For example, at a rotation of 3.7°, particles emitted in a more forward direction have higher energies than the median energy. On the other hand, particles emitted in a more backward direction have lower energies than the median energy.

Viewed from the target, the sense of rotation of the quadrupole lens 13, is counterclockwise from the position of FIG. 2 (i.e. from a position with its alternate north and south poles equi-distant from the reaction plane and a vertical plane normal thereto) so that the particles of higher energy than the average will be deflected above the reaction plane by the rotated quadrupole lens 13. On the other hand, particles of lower energy than average will be deflected below the reaction plane by the rotated quadrupole lens 13 of FIG. 3. This pre-deflection by the rotated quadrupole lens 13 aids the dipole deflecting magnet 11 in bringing particles of various energies to a focus. If the energy of a particle is too high compared with the median energy, the rotated quadrupole lens 13 will deflect the particle in the same direction as the dipole deflecting magnet 11 so that the total deflection experienced by the particle will be just sufficient to bring it to the central axis at the image point. On the other hand, if the energy of a particle is too low compared with the median energy, the rotated quadrupole lens 13 will deflect the particle in the opposite direction from the dipole deflecting magnet 11.

It was found that the higher energy particles, which are deflected upward by the rotated quadrupole lens 13, encounter shorter flight paths in the magnet 11 than do the particles with the median energy. On the other hand, the lower energy particles which are deflected downward by the rotated quadrupole lens 13, encounter longer flight paths in the magnet 11 than do the particles with the median energy. The variation in flight paths hinders the Doppler correction but not enough to offset the beneficial effect of predeflection by the rotated quadrupole lens 13. The combination of a rotated quadrupole lens 13 and deflecting magnet 11 is achromatic in the sense that particles with small spatially correlated spread in energies resulting from the Doppler effect are focused at the same distance from the boundary of magnet 11 in the median plane. A quadrupole is not first order dispersive. However, the correspondence between the spatial behavior of the Doppler spread and the variation in field strength in the rotated quadrupole lens 13 of this invention has been shown to be capable of eliminating the heretofore known Doppler broadening of the image. Moreover, the indicia 21 provided for the turning handle 19, directly indicate the Doppler broadening correction that is made by rotating lens 13 therewith.

In accordance with another embodiment, an additional quadrupole lens, like the lens 13 of FIG. 2, is placed between the first quadrupole lens and the dipole. This second lens is rotated from the position of the unrotated lens 13 shown in FIG. 2, and receives the particles from the target after they have been transmitted through the unrotated lens 13. If this additional quadrupole lens is rotated 45°, its field strength can be adjusted suitably to achieve correction for Doppler broadening.

The invention has the advantage of providing standard elements in a practical and efficient large transmission, charged particle magnetic deflecting spectrograph and means for correcting the Doppler broadening of the line images therein. Also, means are provided for accurately measuring the same by determining the angular position of a quadrupole magnetic lens that is rotatable around an axis between a standard target and detector for a spectrograph. Moreover, in accordance with this invention actual tests of a quadrupole lens rotated counter-clockwise 3.7 degrees from a position with its alternate north and south poles equi-distant from the target reaction plane and a vertical plane normal to the target reaction plane effectively corrects for the Doppler broadening in a multiple-gap spectrograph having perpendicular reaction and median magnetic deflecting planes.

What is claimed is:

1. In a magnetic spectrograph for use with a bombarding beam of charged particles that are directed against a target to produce nuclear reaction products traveling along a path between the target and a detector for producing characteristic spectrographic lines that are subject to Doppler broadening, the improvement comprising means consisting of a system of dipole deflecting and quadrupole magnetic focusing elements including a quadrupole magnet having alternate north and south poles and means for rotating said poles for receiving said reaction products and transporting them to said detector with said poles rotated about an axis in said path for compensating for said Doppler broadening of said characteristic spectrographic lines in said detector.

2. The invention of claim 1 in which said means for rotating said poles has a handle and a bearing for the rotation of said poles to a predetermined angle about said axis from a position with said alternate north and south poles equidistant from a horizontal plane coinciding with said axis and a vertical plane normal to said horizontal plane and also coinciding with said axis.

3. The invention of claim 1 in which said quadrupole magnet has means for indicating the relative angular position of rotation of said poles about said axis.

4. The invention of claim 1, in which said system has two quadrupole magnetic focusing elements in successive stages for producing successive, uniform gradient, stationary and rotatable magnetic fields along said path that increase in strength in a direction away from said first mentioned axis, said second quadrupole magnetic focusing element forming said magnet having said means for rotating said poles about said axis for compensating for said Doppler broadening in said characteristic spectrographic lines, and a dipole deflecting element for receiving said reaction products from said target through said quadrupole magnetic focusing elements and transporting them to said detector along a second axis at right angles to said first mentioned axis.

References Cited
UNITED STATES PATENTS

| | | | |
|---|---|---|---|
| 3,084,249 | 4/1963 | Enge | 250—41.9 |
| 3,344,357 | 9/1967 | Blewett | 250—41.9 |
| 3,405,363 | 10/1968 | Brown | 250—41.9 |

WALTER STOLWEIN, Primary Examiner

C. E. CHURCH, Assistant Examiner